US009794622B2

(12) United States Patent
Syed et al.

(10) Patent No.: US 9,794,622 B2
(45) Date of Patent: Oct. 17, 2017

(54) METHOD AND SYSTEM FOR REMOTELY TRANSCODING CONTENT

(71) Applicant: The DIRECTV Group, Inc., El Segundo, CA (US)

(72) Inventors: Khader B. Syed, Derwood, MD (US); Michael J. Koehnlein, Ijamsville, MD (US); Scott D. Casavant, Germantown, MD (US); Sean S. Lee, Potomac, MD (US); Kuriacose Joseph, Gaithersburg, MD (US); Jorge H. Guzman, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 152 days.

(21) Appl. No.: 14/518,616

(22) Filed: Oct. 20, 2014

(65) Prior Publication Data
US 2015/0040150 A1 Feb. 5, 2015

Related U.S. Application Data

(63) Continuation of application No. 13/349,271, filed on Jan. 12, 2012, now Pat. No. 8,887,207.

(51) Int. Cl.
H04N 21/4402 (2011.01)
H04N 21/2343 (2011.01)
(Continued)

(52) U.S. Cl.
CPC . *H04N 21/440218* (2013.01); *H04N 21/2343* (2013.01); *H04N 21/234309* (2013.01); *H04N 21/254* (2013.01); *H04N 21/4126* (2013.01); *H04N 21/41407* (2013.01); *H04N 21/42204* (2013.01); *H04N 21/436* (2013.01); *H04N 21/458* (2013.01); *H04N 21/4532* (2013.01); *H04N 21/4627* (2013.01); *H04N 21/4788* (2013.01); *H04N 21/6143* (2013.01)

(58) Field of Classification Search
CPC ....... H04N 21/440218; H04N 21/2343; H04N 21/234309; H04N 21/254; H04N 21/4126; H04N 21/41407; H04N 21/42204; H04N 21/436; H04N 21/4532; H04N 21/458; H04N 21/4627; H04N 21/4788; H04N 21/6143
See application file for complete search history.

(56) References Cited

U.S. PATENT DOCUMENTS 7,213,072 B2 * 5/2007 Coulombe et al. ........... 709/229
2005/0198239 A1 * 9/2005 Hughes ................ G06F 9/4406
709/222

(Continued)

*Primary Examiner* — Chenea Smith
(74) *Attorney, Agent, or Firm* — Harness, Dickey & Pierce, PLC

(57) ABSTRACT

A system and method for remotely transcoding content includes a set top box generating a playlist corresponding to content titles stored in a memory of the set top box. A user device is in communication with the cloud location and the set top box through a network. The user device reviews the playlist and selects a first content title from the playlist to form a selection. The cloud location includes a transcoder device transcoding content corresponding to the selection to form transcoded content. One of the cloud location and the set top box communicates the transcoded content to the user device.

27 Claims, 7 Drawing Sheets

(51) Int. Cl.
*H04N 21/254* (2011.01)
*H04N 21/414* (2011.01)
*H04N 21/422* (2011.01)
*H04N 21/41* (2011.01)
*H04N 21/436* (2011.01)
*H04N 21/45* (2011.01)
*H04N 21/458* (2011.01)
*H04N 21/4627* (2011.01)
*H04N 21/4788* (2011.01)
*H04N 21/61* (2011.01)

(56) References Cited

U.S. PATENT DOCUMENTS

| | | | |
|---|---|---|---|
| 2006/0184978 A1* | 8/2006 | Casey | 725/87 |
| 2009/0222874 A1* | 9/2009 | White et al. | 725/118 |
| 2012/0117146 A1* | 5/2012 | Amidon et al. | 709/203 |
| 2013/0121489 A1* | 5/2013 | Pestoni et al. | 380/210 |

* cited by examiner

METHOD AND SYSTEM FOR REMOTELY TRANSCODING CONTENT

TECHNICAL FIELD

The present disclosure relates generally to a method and system for transcoding content, and, more specifically, to a method and system for remotely transcoding content for distribution to user devices in a content distribution system.

BACKGROUND

The statements in this section merely provide background information related to the present disclosure and may not constitute prior art.

Content programming providers continually provide different ways to provide content to customers. In a traditional sense, content is received at a set top box and is distributed to a display or television associated therewith. Set top boxes may also include a digital video recorder for recording the content instructed by the user. Specific programming or various series may be recorded within the digital video recorder.

Some systems such as the DIRECTV® Nomad® system allow the content to be viewed by a mobile device. The Nomad® system uses a transcoder within the home to transcode the content stored within the set top box into a format desired for the destination user device.

One drawback to providing a transcoder within a location is that the computer chips used for transcoding may not be capable of transcoding into future formats. Providing each subscriber with various equipment is also expensive. Further, maintenance and other customer support are also costly when equipment is provided to each individual customer.

SUMMARY

The present disclosure provides a system and method for providing remote transcoding of content in a content distribution system.

In one aspect of the disclosure, a method includes generating a playlist corresponding to content titles stored in a set top box, communicating the playlist to a user device, selecting a first content title from the playlist at the user device to form a selection, transcoding content corresponding to the selection at a transcoder device to form transcoded content, and communicating the transcoded content to the user device.

In a further aspect of the disclosure, a system for remotely transcoding content includes a set top box generating a playlist corresponding to content titles stored therein. A user device is in communication with the cloud location and the set top box through a network. The user device reviews the playlist and selects a first content title from the playlist to form a selection. The cloud location includes a transcoder device transcoding content corresponding to the selection to form transcoded content. One of the cloud location and the set top box communicates the transcoded content to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
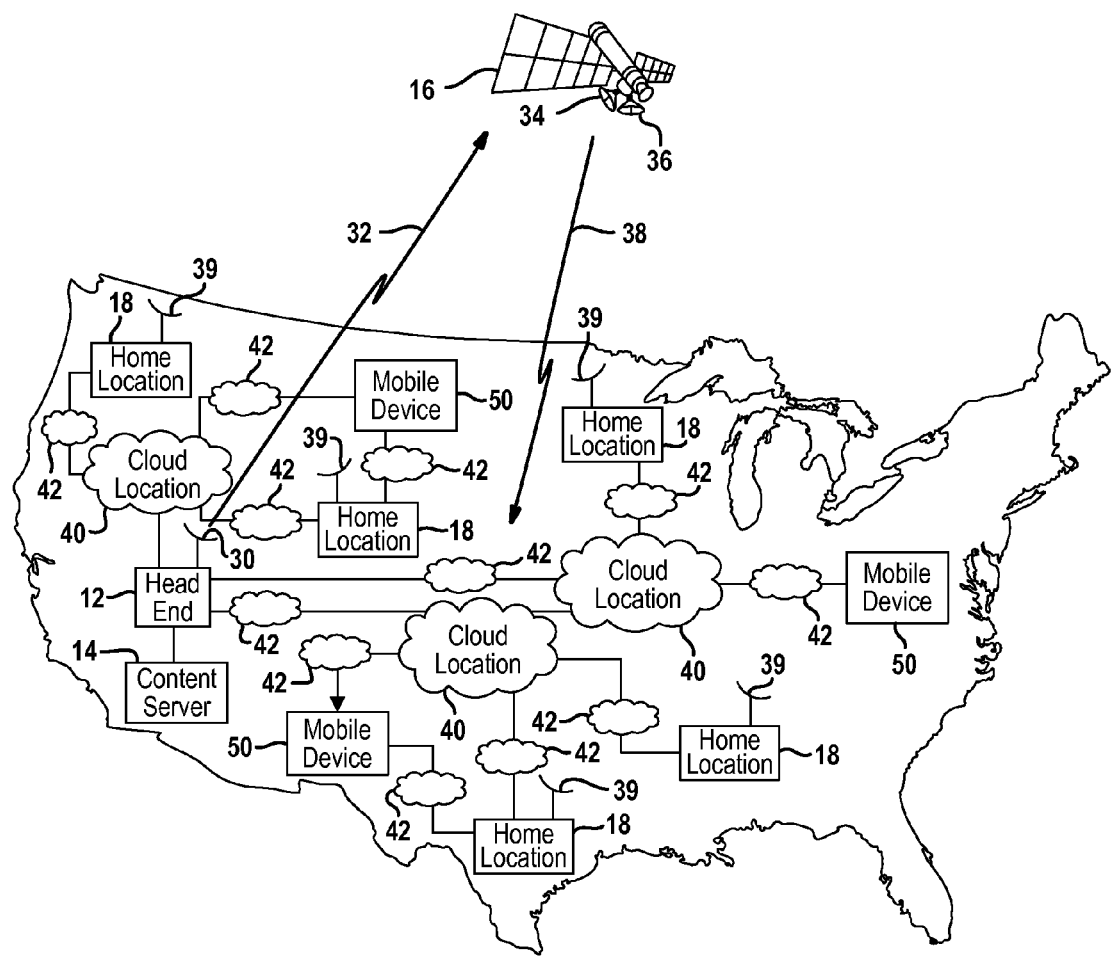
FIG. 1 is a high-level block diagrammatic view of a content distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a content distribution system 10 includes a head end 12 that is used for processing, security and as a transmission source. Of course, the various functions may be physically separated. A plurality of content providers, one of which is shown at reference numeral 14 and a satellite 16, is set forth. The satellite 16 is used to communicate different types of data or different portions of data from the head end 12 to a home location 18 and components set forth therein. As is illustrated, a map of the United States 20 is set forth with a plurality of home locations 18. The home locations 18 represent a residence, business or multiple-dwelling unit. Various home devices are represented by the home locations 18.

The head end 12 may communicate with the satellite 16 using an uplink antenna 30. The uplink antenna 30 generates an uplink signal 32 which is received at a receiving antenna 34. A downlink antenna 36 generates a downlink signal 38 that is communicated to a receiving antenna 39 associated with each home location 18. Various types of content may be provided through the content distribution system 10 including linear content, pay-per-view (PPV) and streaming content may all be provided to the home location 18.

Security of assets broadcast via the satellite 16 may be established by applying encryption and decryption to assets or content during content processing and/or during broadcast (i.e., broadcast encryption). For example, an asset may be encrypted based upon a control word (CW) known to the head end 12 and known to the home location 18 (and the receiving devices therein) authorized to view and/or playback the asset. In the illustrated example content distribution system 10, for each asset the head end 12 generates a control word packet (CWP) that includes, among other things, a time stamp, authorization requirements and an input value and then determines the control word (CW) for the asset by computing a cryptographic hash of the contents of the CWP.

The CWP is also broadcast to the receiving devices in the home locations 18 via the satellite 16. The devices authorized to view and/or playback the broadcast encrypted asset will be able to correctly determine the CW by computing a cryptographic hash of the contents of the received CWP. If the device is not authorized, it will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption. Thus, a user device may be deauthorized by not allowing a user device access to the proper control word.

The control word packet may be communicated with other control data as a conditional access packet (CAP). The CAP may be used to provide tuning data, geographic location profiles or other data. The CAP may also be used to provide instructions to the set top box to perform specific tasks such as upload a playlist or upload content stored within a receiving device.

A plurality of geographically spaced cloud locations 40 are set forth within the figures. The cloud locations 40, as will be described below, may include cloud devices such as, but not limited to, servers, transcoding devices and storage devices. The cloud location 40 is in communication with the home location 18 and the head end 12. The cloud location 40 is in communication with the home locations 18 through a network 42. The network 42 may be one network or a plurality of networks acting together. For example, the network 42 may be a broadband network and may be wired, optical or wireless. Cellular telephone technology and public switched telephone networks may also be used. The network 42 may include the Internet. The network 42 allows various types of communication to occur between the home location 18 and the cloud location 40. By way of example, the home location 18 may communicate a playlist to the cloud location 40. Further, content stored within the home location 18 may be provided to the cloud location 40 for transcoding. Other types of signals are exchanged between the home location 18 and cloud location 40 as will be described in the examples below.

A mobile device 50 may also be in communication with the home location 18 through the network 42. The mobile device 50 may provide various request signals that may communicate directly to the home location 18. Further, the mobile device 50 may be in communication with the cloud location 40 through the network 42. The mobile device 50 may be in communication with the cloud location 40 for obtaining a playlist or transcoded content. Of course, other signals may be exchanged between the cloud location 40 and the mobile device 50 as will be set forth in the examples below.

A plurality of cloud locations 40 may be provided throughout the country. By providing a plurality of cloud locations 40, the closest cloud location 40 to the mobile device 50 may be used for transcoding and other distribution.

The cloud location 40 and the head end 12 may also be coupled together through the network 42. Various authorizations, content and other data may be exchanged therebetween.

Figure 2:
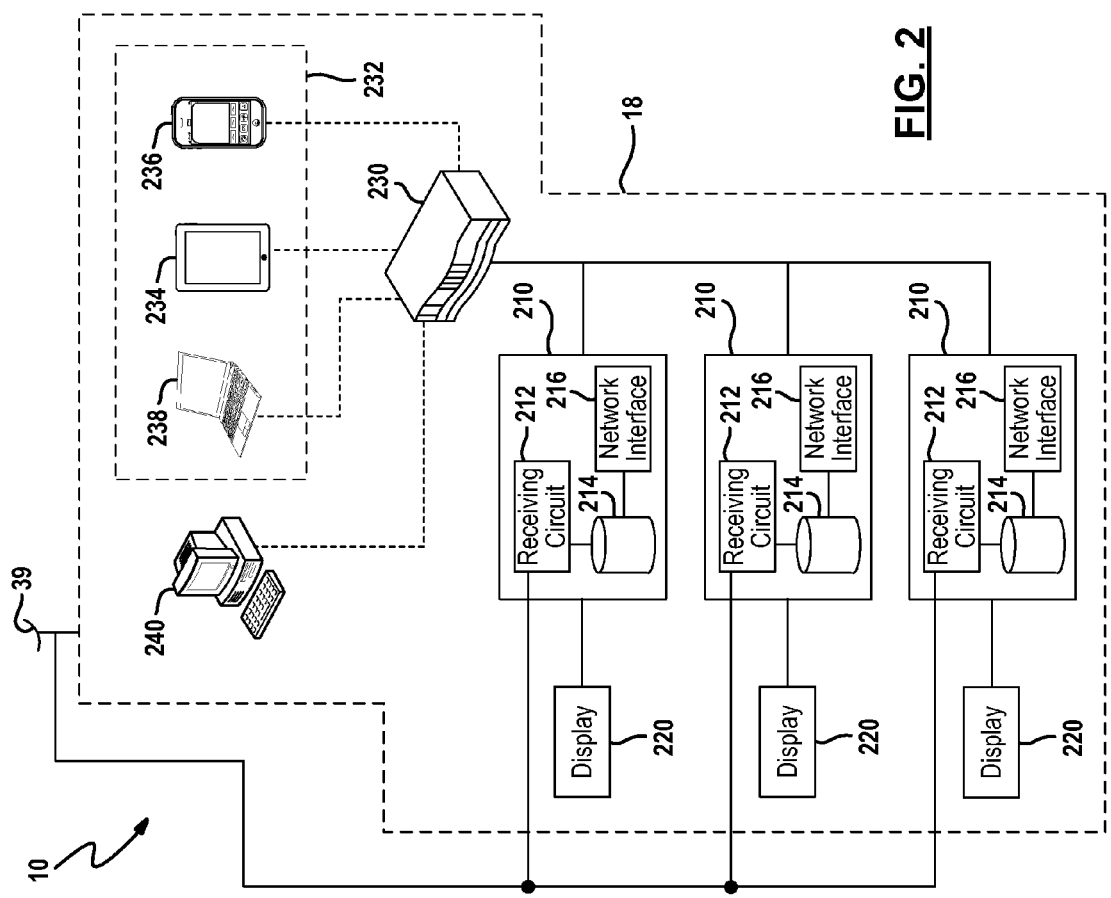
FIG. 2 is a block diagrammatic view of a home system according to the present disclosure.

Referring now to FIG. 2, one example of a home location 18 is set forth. The home location 18 may include one or more receiving devices 210 such as a set top box (STB). Each receiving device 210 may include various receiving circuits 212 used for receiving content through the antenna 39. The antenna 39 may be used for receiving content from a satellite. However, a mentioned above, the receiving device 210 may also be used for non-satellite configurations. That is, the receiving device 210 may also be used for receiving over-the-air terrestrial signals and cable or fiber optic signals. The functions of the receiving circuits 212 may be adjusted for the different types of transmission technologies. The receiving circuits 212 may include, for example, a tuner for receiving a particular channel or channels, a decoder and a forward error-correcting encoder.

The receiving devices 210 may also include a storage device 214. The storage device 214 may store various content, lists and other data therein. The storage device 214 may be a memory such as a hard disk drive or solid state memory. The storage device 214 may also be different kinds of memory such as a digital video recorder and flash memory. The storage device 214 may also be used to store play lists corresponding to a list of content that is stored within the storage device 214.

A network interface 216 may also be included within the receiving device 210. The network interface 216 may provide a broadband interface so that various content, playlists and other data may be exchanged with other devices such as the cloud location 40.

Each receiving device 210 may include a display 220 associated therewith. The display 220 may be a television or other type of monitor. The display 220 may generate both video and audio displays.

The home location 18 may also have a router 230 associated therewith. If more than one receiving device 210 is included within the home location 18, each of the receiving devices 210 may be in communication with the router 230.

The router 230 is also illustrated in communication with other devices including mobile devices 232 that may include a tablet device 234, a mobile computer 236, and a cellular telephone 238. A computer 240 may also be in communication with the router 230. Each of the devices 234-240 may be referred to as a user device. As will be further described below, the mobile devices 232 may also be in communication with the internet or other network without being in a home network. To communicate with the cloud location 40 and the home location 18, a broadband connection may be established through the network 42 illustrated in FIG. 1.

Figure 3:
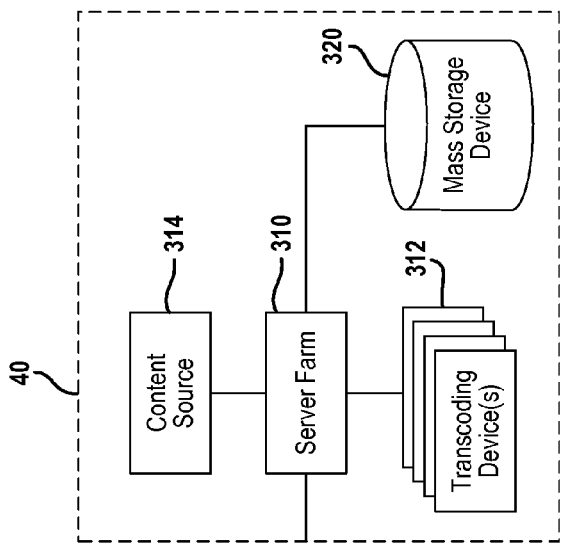
FIG. 3 is a block diagrammatic view of a cloud location.

Referring now to FIG. 3, the cloud location 40 is illustrated in further detail. The cloud location 40 may include a server farm 310 that is in communication with the network 42. The server farm 310 may include at least one server. However, a plurality of servers is likely in a commercial embodiment. A plurality of transcoding devices 312 are in communication with the server farm 310. The transcoding devices 312 are configured to provide various different types of transcoding for different types of devices. Each device may provide a different type or types of transcoding. The number of transcoding devices 312 depends upon various factors including the amount of customers in the system and the desired throughput of the system.

The server farm 310 may also be in communication with a content source 314. The content source 314 may obtain content through the network 42 or from another type of communication device such as a satellite 16. As will be described below in various examples, the content source may receive all of the content broadcast by a content provider through the satellite or other content provider.

The server farm 310 may be in communication with a mass storage device 320. The mass storage device 320 may be used for the storage of various types of data including playlists, content, transcoded content and metadata associated with the content. In one example, the mass storage device captures all the content broadcasted by the satellite.

Figure 4:
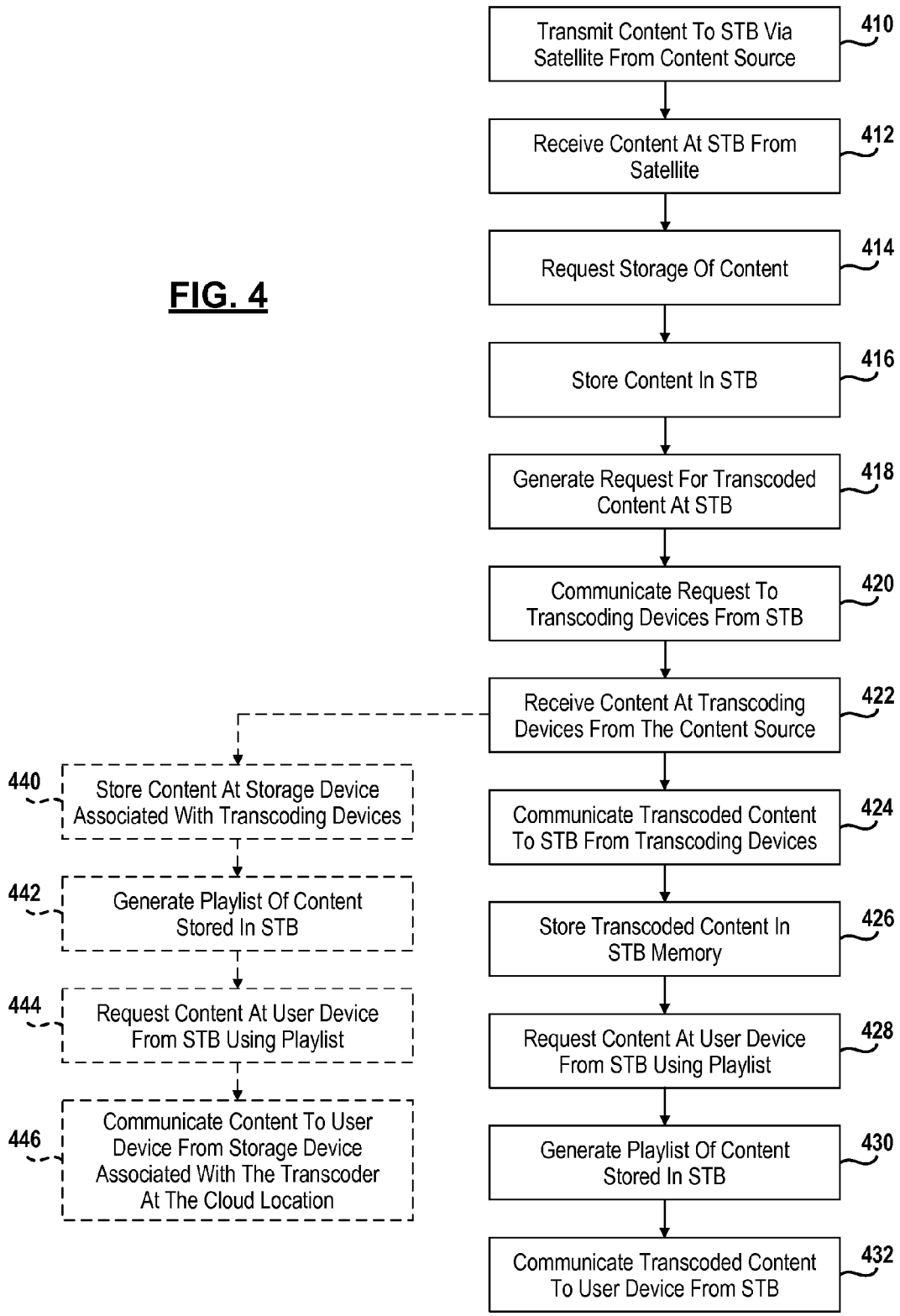
FIG. 4 is a flowchart of a first method for operating the present disclosure.

Referring now to FIG. 4, a first method of remotely transcoding content is set forth. In this example, the transcoding devices are provided at the cloud location 40. Storage for the transcoded content is within the set top boxes (STBs) and transcoding takes place automatically when user recordings are initiated at the receiving device or set top box. By way of example, the receiving device will be described as a set top box and satellite transmission is used.

In step 410, content is transmitted to the set top box by way of the satellite from the content source. In step 412, content is received at the set top box from the satellite. In step 414, content is requested to be stored in the set top box. Requesting of content may be initiated through a user interface displayed on the display 220 illustrated in FIG. 2. Requesting storage of content may also be initiated using a mobile user device, a voice-activated system, or a remotely located website. Instructions for storing the content including the time, channel and other data used for retrieving the content is set forth. For a satellite system this may include the transponder location.

In step 416, content is stored in the set top box in response to the request. In step 418, a request for transcoded content is generated at the set top box. The request for transcoded content may be initiated in response to the request for the storage of content. A user may be prompted to describe the device or format into which the content may be transcoded. Thus, some negotiation may take place between the cloud and the user device. A device type identifier may be included in the request signal. Step 418 may also be performed automatically. In step 420, a request to transcode is communicated to the transcoding devices from the set top box. The request to transcode is a signal provided through the network 42 illustrated in FIG. 1. A request to transcode may also include the content itself that is stored within the set top box. In step 422, the content may also be received in parallel to the set top box through the content source 314 illustrated in FIG. 3. The transcoding devices 312 may thus simultaneously receive the content and transcode the content according to the request received from step 420. In step 424, the transcoded content is communicated in a transcoded content signal to the set top box from the transcoding devices. The transcoded content is stored in the set top box memory in step 426. In step 428, a playlist of the content stored on the set top box is generated. In step 430, a request for stored content is generated at a user device such as a mobile user device. The request for content is communicated from the user device to the set top box. The request for content corresponds to a content title that appears in the playlist. As mentioned above, the playlist is a list of titles of content available or stored within the set top box. In addition, the playlist may include content available in the cloud location. Such content may correspond to a subscription. In step 432, the transcoded content is communicated to the user device from the set top box. More specifically, the transcoded content is provided to the user device in a signal from the memory of the set top box.

Referring back to step 422, an alternative process for the last several steps illustrated in FIG. 4 is set forth. In step 440, content is stored at the storage device associated with the transcoding devices after the content is transcoded. In step 442, a playlist of content stored in the set top box is generated. In step 444, a request for content at the user device from the set top box is generated using the playlist. In step 446, content is communicated to the user device from the storage device associated with the transcoder at the cloud location. Thus, in the alternative example, the transcoded content need not be stored within the set top box.

Figure 5:
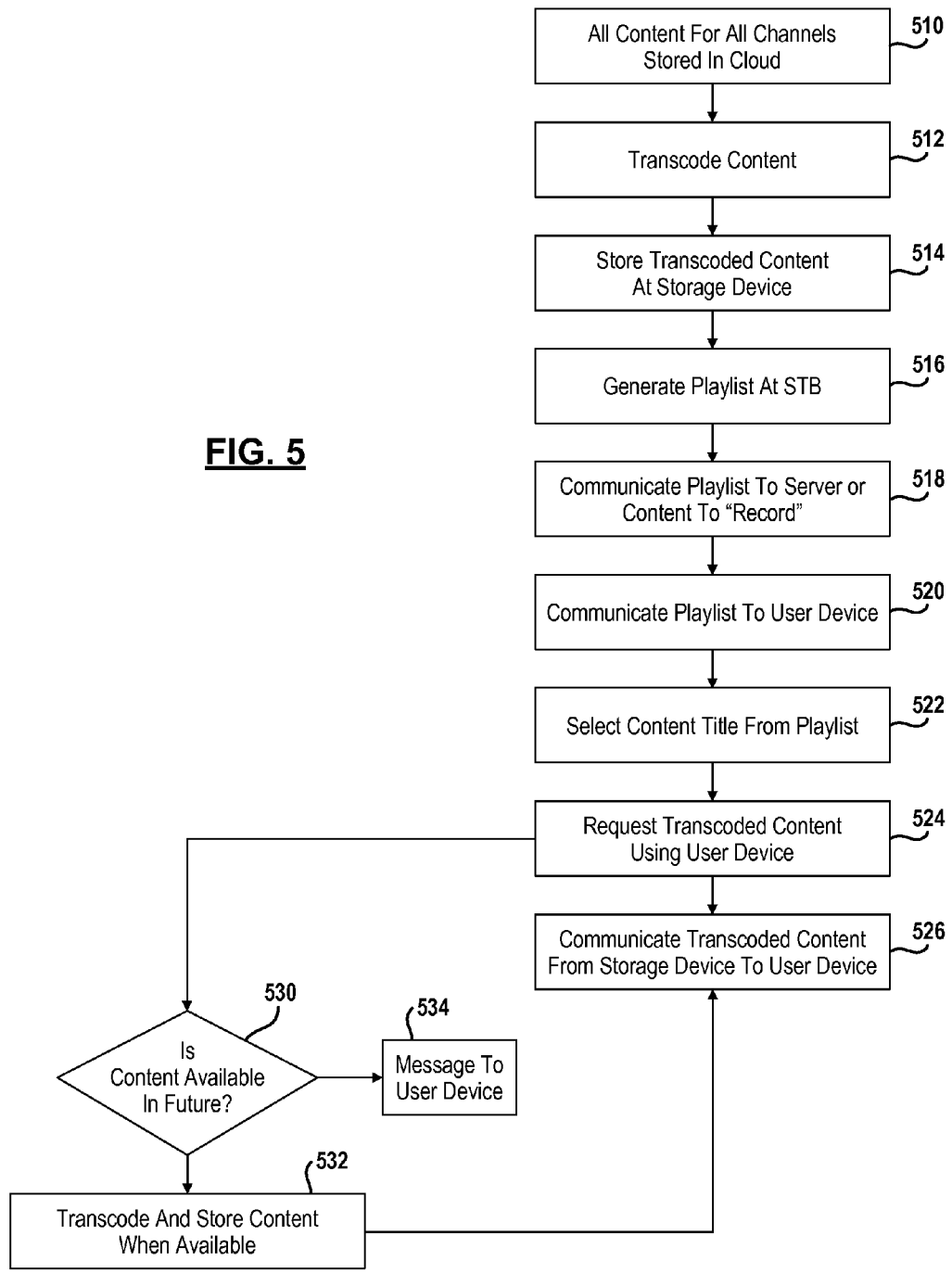
FIG. 5 is a flowchart of a second method for operating the present disclosure.

Referring now to FIG. 5, a second method for remotely transcoding content is set forth. In this example, the transcoding devices 312 are also located within the cloud location. Both the original and transcoded content are stored within the cloud.

In step 510, all of the content for all of the channels is stored within the storage device 320 at the cloud location. The size of the storage device is relatively large. Thus, the content source 314 receives all of the content broadcasted by the satellite or through another means such as a cable or optical fiber. In step 512, the content is transcoded at the cloud location. In step 514, the content is stored in the storage device of the cloud location.

In step 516, playlists of content desired to be stored within the set top box may be generated. The playlist may be generated in a similar manner to steps 414 and 416. Simultaneously, content may also be recorded at the set top box in only one format useful for playback directly at the set top box and display associated therewith.

In step 518, a playlist generated from the content desired to be stored within the set top box is communicated to the server associated with the cloud location 40. In step 520, the playlist is also communicated to the user device in a playlist signal. In step 522, a content title is selected to form a selection from the playlist. The selection is communicated to the cloud location 40. More specifically, the server farm 310 may receive the content title from the playlist to form a request. In step 524, the request for transcoded content is communicated in a request signal from the user device to the server farm 310 of the cloud location 40. In step 526, the transcoded content is communicated from the cloud location and the storage device 320 to the user device in a transcoded content signal.

Alternate steps may also be provided for future available content. Step 530 determines whether content is going to be available in the future. This step is performed when content is not immediately available from the stored transcoded content. When transcoded content will be available in the future, step 532 transcodes the content when the content becomes available. The transcoded content may then be stored in the storage device. The content may then be communicated to the user device in step 526 as described above. In step 530, when the content is not going to be available in the future, step 534 generates a message that is communicated to the user device to inform the user that the content is not currently available and will not be available in the future.

Alternatively, transcoded content may be transcoded on demand and transferred to the requesting user device directly from the transcoding device without first being stored.

Figure 6A:
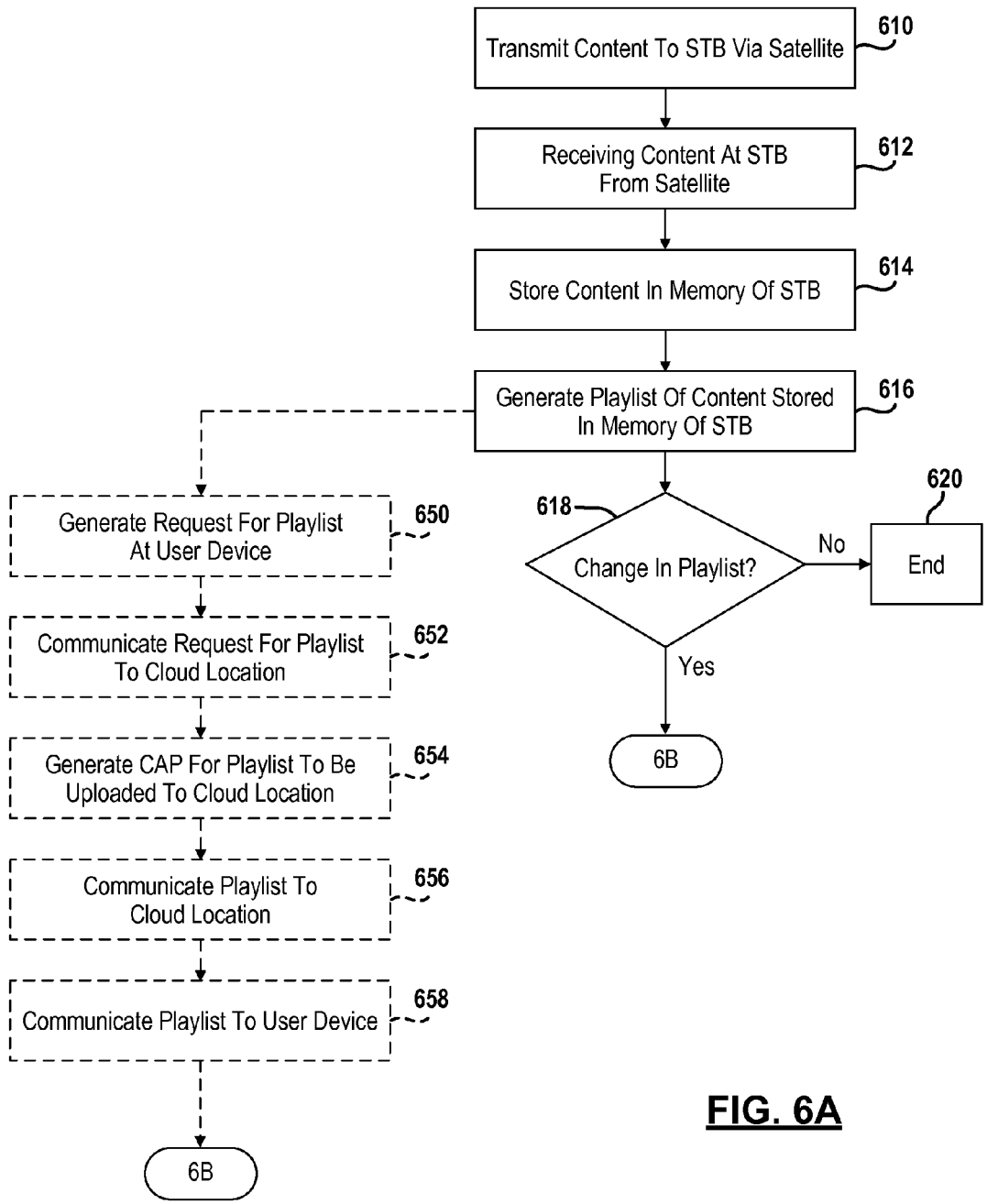
FIGS. 6A and 6B are a flowchart of a third method for operating the present disclosure.
Figure 6B:
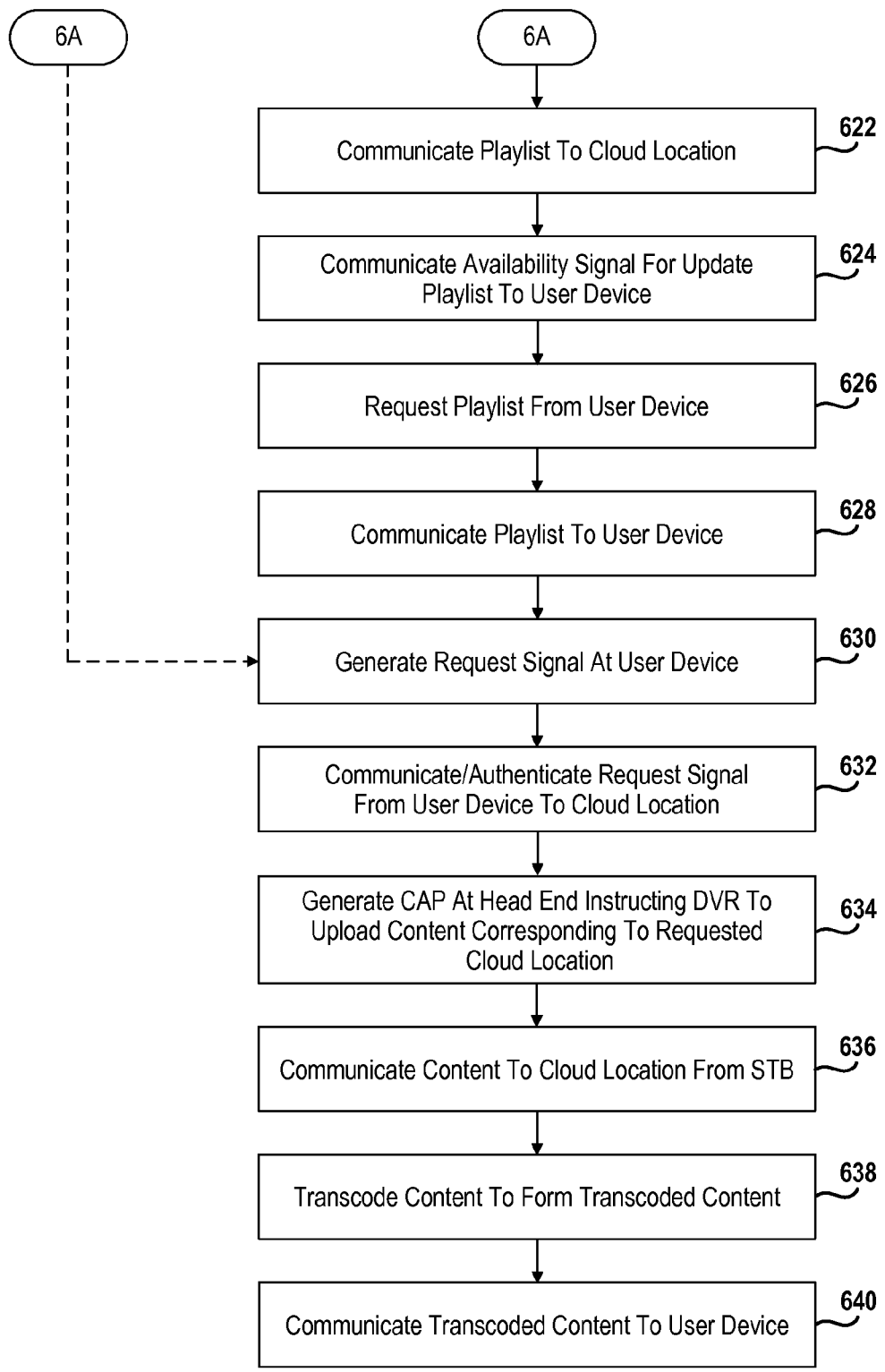

Referring now to FIGS. 6A and 6B, another method for remotely transcoding content is set forth. In this example, the playlist and recordings are uploaded to the cloud location and the playlist and recordings may be downloaded to mobile or other user devices.

In step 610, content is transmitted to the receiving device such as a set top box by way of satellite. In this example, a set top box will be used as an example of a receiving device. In step 612, content is received at the set top box from the satellite. In step 614, the content is stored in the memory of the set top box. The memory may, for example, be a digital video recorder. In step 616, a playlist of the content stored in the memory of the set top box is generated. This process is described in detail above. In step 616, it is determined whether a change in the playlist has occurred. If no change in the playlist has occurred, the process ends in step 620. If a change has occurred in step 618, step 622 communicates the playlist to the cloud location. The cloud location may consist of the server farm 310 illustrated in FIG. 3. In step 624, an availability signal may be communicated with the user devices associated with the updated playlist.

In step 626, the playlist may be requested by a particular user device using a request signal. In step 628, the playlist is communicated to the user device through the network using a playlist signal.

In step 630, a request signal is generated at the user device requesting content therefrom. The request signal may be communicated to the cloud location and authenticated at the cloud location in step 632. In step 634, a conditional access packet is generated at the head end instructing the storage device such as the digital video recorder to upload content corresponding to the requested cloud location. The conditional access packet may be originally requested to be generated by the cloud location in communication with the user device and transmitted through the network to the head end. In step 636, the content is communicated to the cloud location from the set top box. Instructions are provided in the conditional access packet signal for uploading the content to the particular cloud location. In step 638, the content from the set top box is transcoded to form transcoded content. In step 640, the transcoded content is communicated to the user device in a transcoded content signal. The transcoded content is transcoded into a format suitable for the requesting user device.

Referring back to step 616, alternative steps may be performed. In step 650, a request for a playlist is generated in a request signal at the user device. The request signal may be communicated to a cloud location in step 652. In step 654, a conditional access packet (CAP) signal is generated in response to the request signal. The conditional access packet signal may contain instructions for the user device to form a playlist and communicate the playlist to the cloud location. The cloud location may include an address for communicating the playlist thereto. The cloud location may be chosen based upon the relative position of the user device so that the cloud location is closest to the requesting user device.

In step 656, the playlist is communicated from the set top box to the cloud location. In step 658, the playlist is communicated to the user device from the cloud location. After step 658, steps 630-640 are performed.

Figure 7:
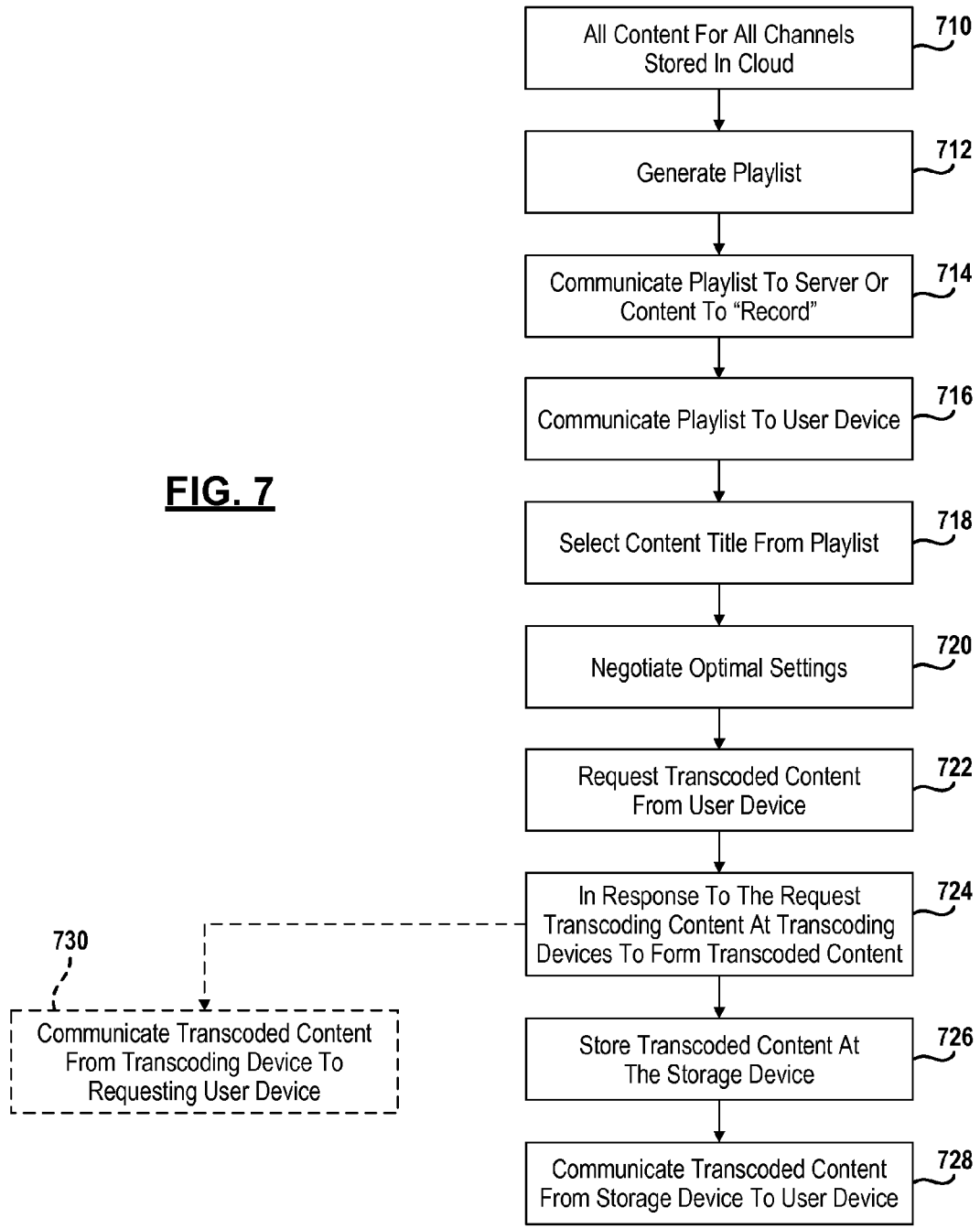
FIG. 7 is a flowchart of a fourth method for transcoding content according to the present disclosure.

Referring now to FIG. 7, a fourth method for remotely transcoding content is set forth. In this example, the transcoding devices 312 are also located within the cloud location. Both the original and transcoded content are stored within the cloud and the initiation of the transcoding operation is performed in response to a request for transcoded content from a user device.

In step 710, all of the content for all of the channels is stored within the storage device 320 at the cloud location. The size of the storage device is relatively large. Thus, the content source 314 receives all of the content broadcasted by the satellite or through another means such as a cable or optical fiber. In step 712, playlists of content is generated. The playlist may be generated in a similar manner to steps 414 and 416. The playlist may also include content available from the cloud location (stored or about to be stored). Simultaneously, content may also be recorded at the set top box in only one format useful for playback directly at the set top box and display associated therewith.

In step 714, a playlist generated from the content desired to be stored within the set top box is communicated to the server associated with the cloud location 40. In step 716, the playlist is communicated to the user device in a playlist signal. In step 718, a content title is selected to form a selection from the playlist. The selection is communicated to the cloud location 40. More specifically, the server farm 310 may receive the content title from the playlist to form a request. In step 720, the user device and server farm 310 intercommunicate to negotiate optimal settings such as the user device resolution, encoding formats, bit rates supported and encryption formats supported. Such negotiation may take place in any of the methods described above. In step 722, the request for transcoded content is communicated in a request signal from the user device to the server farm 310 of the cloud location 40. In step 724, the request for transcoded content at the transcoding devices is used to form transcoded content according to the negotiated settings including digital rights management, encoding, and resolution. In step 726, the transcoded content is stored at the storage device 320 of the cloud location as illustrated in FIG. 3. In step 728, the transcoded content is communicated from the cloud location and the storage device 320 to the user device in a transcoded content signal. The content may be streamed or downloaded based on the negotiation. A set top box may be used to communicate the content to the user device. The content may be communicated through the satellite or network to the set top box.

An alternative to steps 724-728 is set forth in step 730. In step 730, the transcoded content is transcoded on demand and transferred to the requesting user device directly from the transcoding device without first being stored at the storage device as set forth in step 524 above.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating a playlist corresponding to content titles stored in a first cloud location;
communicating the playlist to a user device;
selecting a first content title from the playlist at the user device to form a selection;
communicating the selection to a server farm;
in response to selecting, negotiating optimal settings by intercommunicating between the user device and the server farm associated with a mass storage device;
transcoding content corresponding to the selection at a transcoder device in a second cloud location to form transcoded content in response to the optimal settings;
storing the transcoded content at the mass storage device; and
communicating the transcoded content to the user device from the mass storage device.

2. The method as recited in claim 1 wherein negotiating optimal settings comprises determining a transcoding configuration.

3. The method as recited in claim 2 wherein transcoding comprises transcoding in response to the transcoding configuration.

4. The method as recited in claim 1 wherein negotiating optimal settings comprises determining an encoding configuration.

5. The method as recited in claim 4 wherein transcoding comprises transcoding in response to the encoding configuration.

6. The method as recited in claim 1 wherein negotiating optimal settings comprises determining a digital rights management configuration.

7. The method as recited in claim 6 wherein transcoding comprises transcoding in response to the digital rights management configuration.

8. The method as recited in claim 1 wherein communicating the transcoded content comprises communicating the transcoding content in response to the optimal settings.

9. The method as recited in claim 1 wherein transcoding content is performed in response to receiving the selection at a server associated with the transcoder device.

10. The method as recited in claim 1 further comprising storing content in the user device.

11. The method as recited in claim 1 further comprising generating the playlist based upon a user account.

12. The method as recited in claim 1 wherein communicating the transcoded content comprises communicating the transcoded content to the user device from the mass storage device through the first cloud location collocated with the second cloud location.

13. The method as recited in claim 1 further comprising communicating the playlist to the first cloud location from a set top box.

14. The method as recited in claim 1 wherein communicating transcoded content comprises communicating transcoded content from the second location.

15. A system comprising:
a first cloud location generating a playlist corresponding to content titles stored therein;
a server farm associated with a mass storage device;
a user device in communication with the first cloud location through a network, said user device reviews the playlist and selects a first content title from the playlist to form a selection, said user device negotiating optimal settings by intercommunicating between the user device and the server farm in response to forming the selection, said user device communicating the selection to the server farm;
a second cloud location comprising a transcoder device transcoding content corresponding to the selection to form transcoded content and storing the transcoded content in the mass storage device associated with the server farm; and
said mass storage device communicating the transcoded content to the user device.

16. The system as recited in claim 15 wherein the optimal settings comprise an encoding configuration.

17. The system as recited in claim 16 wherein the first or second cloud location communicates in response to the encoding configuration.

18. The system as recited in claim 15 wherein the optimal settings comprise a transcoding configuration.

19. The system as recited in claim 18 wherein the first or second cloud location communicates in response to the transcoding configuration.

20. The system as recited in claim 15 wherein the optimal settings comprise a digital rights management configuration.

21. The system as recited in claim 20 wherein the first or second cloud location communicates in response to the digital rights management configuration.

22. The system as recited in claim 15 wherein the second cloud location transcodes the content in response to the optimal settings.

23. The system as recited in claim 15 wherein the second cloud location transcodes the content in response to an encoding configuration.

24. The system as recited in claim 15 wherein the mass storage device is located remotely from the second cloud location.

25. The system as recited in claim 15 wherein the user device communicates a request for the playlist to the first cloud location and the mass storage device communicates the content to the user device through the second cloud location.

26. The system as recited in claim 15 wherein the mass storage device communicates the transcoded content to the user device through the first cloud location.

27. The system as recited in claim 15 wherein the mass storage device communicates transcoded content to the user device through the second cloud location.

* * * * *